INVENTOR.
Robert Thomson
BY
Harness, Dickey & Pierce.
ATTORNEYS.

March 20, 1956 — R. THOMSON — 2,739,011
VEHICLE WINDSHIELD MOUNTING
Filed Oct. 31, 1952 — 2 Sheets-Sheet 2
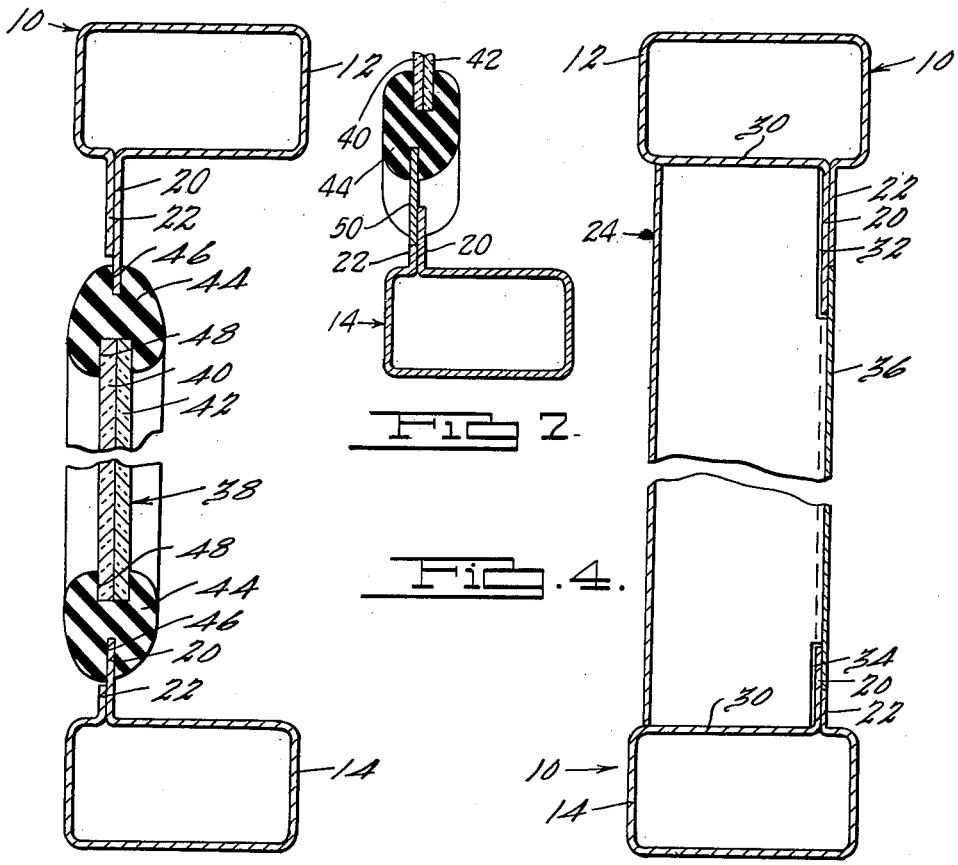
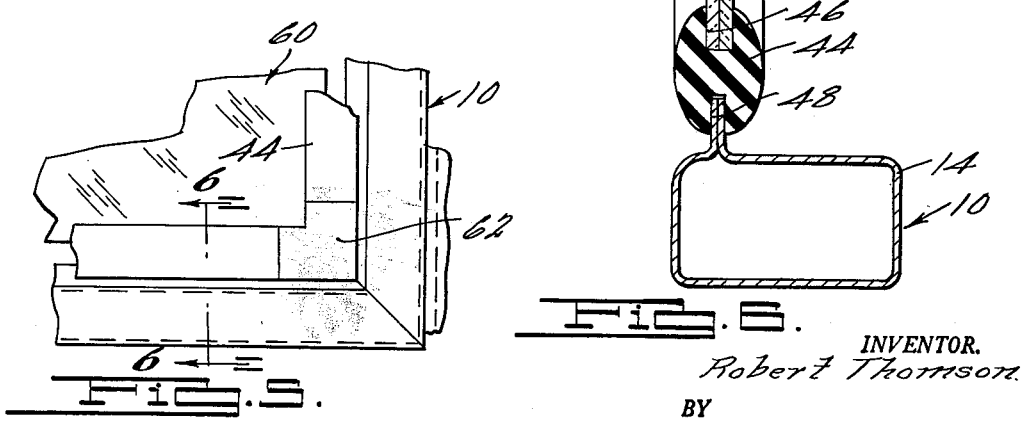
INVENTOR.
Robert Thomson
BY Harness, Dickey & Pierce
ATTORNEYS.

United States Patent Office 2,739,011
Patented Mar. 20, 1956

2,739,011

VEHICLE WINDSHIELD MOUNTING

Robert Thomson, Detroit, Mich., assignor to Ainsworth Manufacturing Corporation, Detroit, Mich., a corporation of Michigan Application October 31, 1952, Serial No. 318,007

13 Claims. (Cl. 296—84)

This invention relates to new and useful improvements in windshield constructions for automotive vehicles.

The instant windshield has general utility and can be used on any vehicle requiring a windshield but it is primarily adapted and pre-eminently suited for military-type vehicles.

Heretofore windshields of the type here under consideration, when adapted for military vehicles, have been provided with a relatively large surrounding framework or panel. This panel or framework is made from a single, generally rectangular piece of sheet metal from which the center portion is removed by a conventional stamping operation. Pivoted window sections are mounted in the opening of the panel, and the usual appurtenances such as windshield wipers and the like are mounted on a marginal portion of the panel. The entire subassembly suitably strengthened and reinforced is then mounted on the vehicle.

The panel-type windshield referred to above results in considerable scrap during manufacture, and as a consequence the windshield is expensive to make. Also, the peculiar construction of the windshield requires the manufacturer to maintain a relatively large inventory of different size panels intended for different types and sizes of vehicles. The disadvantage of this to the manufacturer is obvious.

An important object of the present invention is to provide an improved windshield construction that is much simpler and less expensive to manufacture than the panel-type windshield heretofore used.

Another object of the invention is to provide a windshield construction of the above-mentioned type having one or more stationary windows and a surrounding tubular framework of welded construction that is adequately strong and rigid for its intended purpose.

Still another object of the invention is to provide a windshield construction of the above-mentioned character wherein the tubular frame construction eliminates the large amount of scrap inherent in the prior panel-type window as well as the necessity for the manufacturer to maintain the large inventory of parts required by the prior construction.

Yet another object of the invention is to provide a windshield construction of the above-mentioned character wherein the tubular frame members are uniquely formed to facilitate fabrication of the windshield.

Another object of the invention is to provide a windshield construction of the above-mentioned character in which the surrounding frame is uniquely fashioned to assure a weathertight joint between the frame and the window panes.

Other objects and advantages of the invention will be apparent during the course of the following description.

In the drawings forming a part of this specification and wherein like numerals are employed to designate like parts throughout the same:

Fig. 3 is a vertical, sectional view taken on the line 3—3 of Fig. 1;

Fig. 4 is a vertical, sectional view taken on the line 4—4 of Fig. 1;

Fig. 5 is a fragmentary, elevational view showing a modified windshield construction embodying the invention and particularly illustrating a modified means for mounting the window panes in the surrounding framework;

Fig. 6 is an enlarged, fragmentary, vertical sectional view taken on the line 6—6 of Fig. 5; and Fig. 7 is an enlarged, fragmentary, vertical sectional view taken on the line 7—7 of Fig. 1.

Figure 1:
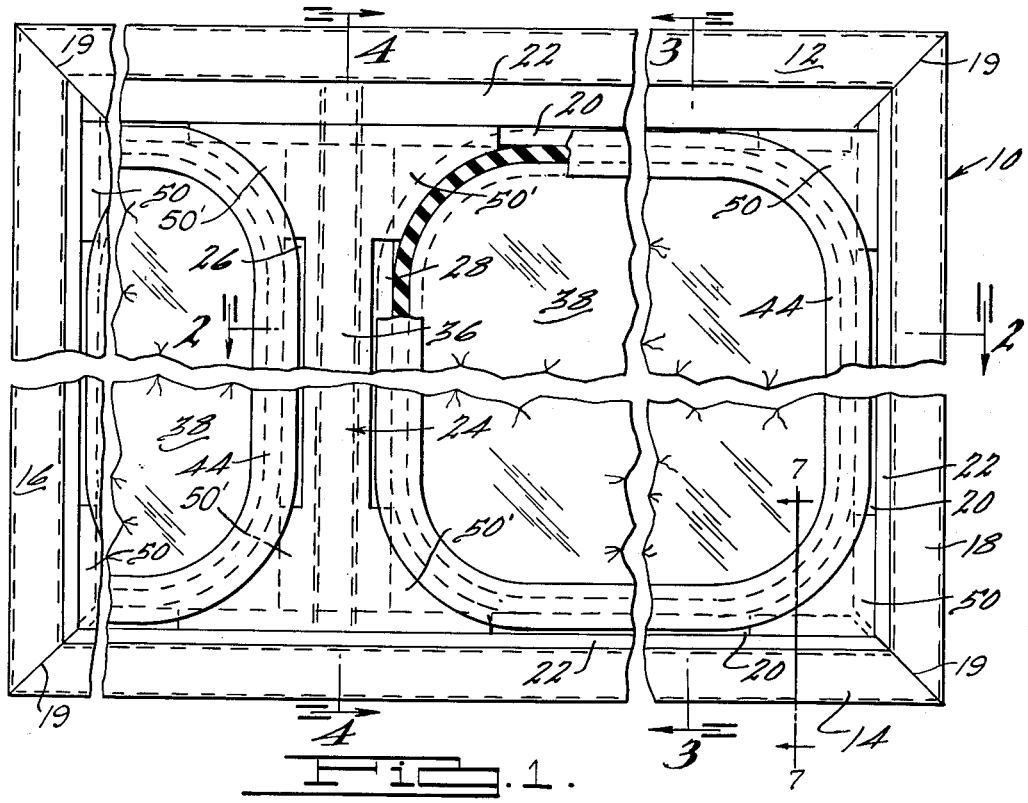
Fig. 1 is a fragmentary, front elevational view of a windshield embodying this invention, parts thereof being broken away and shown in section for clearness of illustration.

Referring first to Figs. 1-4 it will be observed that the windshield of this invention is formed with a surrounding, generally rectangular frame 10 composed of upper and lower longitudinal members 12 and 14 and vertical side members 16 and 18. The frame 10 preferably is adapted to extend entirely across the vehicle (not shown) on which the windshield is to be mounted according to conventional practice, and any suitable or conventional means may be used for fastening the frame to the vehicle. The present invention is concerned only with the formation and fabrication of the windshield itself and is not concerned with the combination of the windshield and the vehicle or with the manner in which the windshield is mounted on and fastened to the vehicle. It is sufficient to say that the frame 10 is adapted to extend transversely across the cowl of the vehicle in the usual manner and that it is disposed in generally upright position on the cowl so as to protect the occupants of the vehicle without obscuring their forward vision.

All of the individual frame members 12, 14, 16, and 18 are identically formed so that the different parts of the frame can be cut from a long strip of preformed stock. The ends of the frame members preferably are mitered, as shown in the drawings, and securely fixed together in any suitable manner, as by welding 19. By reason of this arrangement, the manufacturer need maintain only the preformed tubular stock, and this reduces materially the inventory which he heretofore has been required to maintain. He simply cuts off pieces of appropriate length from the stock material and fabricates the windshield supporting frame from these pieces. Manifestly, windshields of any desired size can be made in this manner and variations in the size of the windshields will not acect in any way the inventory that must be maintained by the manufacturer.

The tubular stock from which the windshield frame 10 is made, as illustrated in the drawings, is generally rectangular in cross section, but it will be appreciated that stock of any other suitable cross-sectional conformation can be employed. It is a feature of the invention, however, that the tubular stock is provided at one side thereof with a pair of laterally extending flanges 20 and 22. These two flanges 20 and 22 are disposed side by side and conveniently can be spot welded or otherwise secured together. The flange 20 is relatively wide and the flange 22 is relatively narrow, so that the flange 20 projects substantially beyond the flange 22. Actually it makes no difference which of the two flanges 20 and 22 is wider, but in the particular embodiment illustrated in the drawings the rearward flange 20 is shown wider than the forward flange 22.

Figure 2:
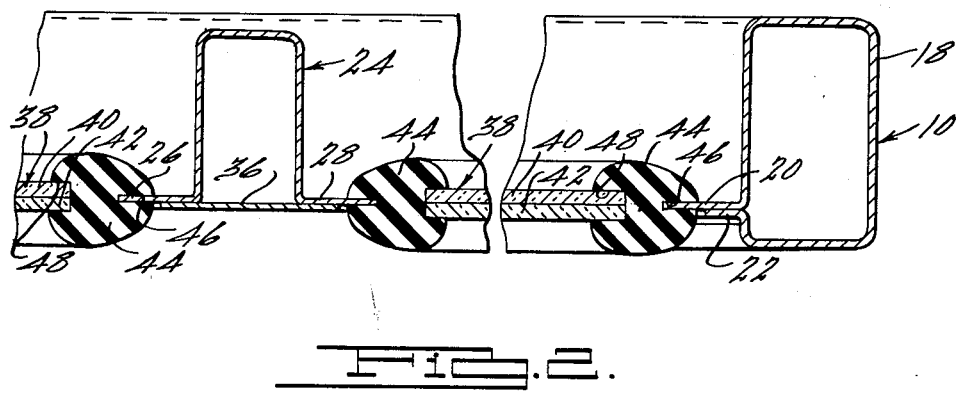
Fig. 2 is a fragmentary, horizontal sectional view taken on the line 2—2 of Fig. 1.

It is contemplated that the windshield be made with a single pane of glass which extends entirely across and entirely fills the frame 10 and it is also contemplated that the frame be divided into two or more sections, each having its own individual pane of glass, all as the exigencies of the particular situation require. In the particular form of the invention here under consideration, the frame 10 is provided with a single center dividing post 24 which divides the frame into two parts of approximately equal size. The center post 24 also preferably is made of sheet metal and the particular post here shown comprises an elongated strip of generally U shape in transverse section (Fig. 2). Outwardly extending flanges 26 and 28 are provided on the opposite longitudinal edges of the strip 24, and the latter is positioned in the frame 10 with the flanges 26 and 28 in the same plane as the flanges 20. As perhaps best shown in Fig. 4 the strip 24 abuts endwise against the upper and lower frame members 12 and 14 and the butted ends thereof are welded as at 30 to the frame members. The flanged side of the strip is recessed as at 32 and 34 to accommodate the frame flanges 20 (Fig. 4) and to permit the flanges 26 and 28 to align properly and extend flush with the flanges 20. Welded or otherwise fixedly secured to the flanged side of the post 24 is a front plate 36. The latter is longer than the post 24 and the projecting end portions thereof overlap the relatively wide flanges 20 and abut against the edges of the relatively narrow flanges 22. The front plate 36 closes the hollow interior of the center post 24, substantially strengthens the post and renders it more rigid and also assists in fastening the post to the frame. Under certain circumstances, the welded joints 30 can be omitted and the center post secured to the frame 10 merely by tack welding or spot welding the projecting ends of the front plate 36 to the overlapping flanges 20.

In the particular form of the invention now under consideration, a separate window 38 is provided in the frame 10 at each side of the center post 24, and each window comprises two panes 40 and 42 of transparent material such as glass or the like disposed one behind the other and in mutually close-fitting pressed engagement. The windows 38 are disposed in the same plane as and are spaced circumferentially inwardly from the flanges 20, 26, and 28 and are fastened securely in this position to the flanges by suitable weather or sealing strips 44 of rubber or the like. The strips 44 are conventional, being of generally oval conformation in transverse section and having grooves 46 and 48 in the outer and inner sides thereof which receive the flanges and window respectively.

The most economical way of assembling the windows 38 and the frame is to provide in each instance a single weather strip 44 which extends entirely around the window. In order for this to be done, however, the individual windows must be formed with rounded corners, as shown in Fig. 1, and if the window is rounded in this manner it is necessary to provide gussets on the frame at the corners of the window. The two gussets 50 at each end of the frame 10 comprise individual elements which are assembled in and welded or otherwise fastened to the frame 10 before the window 38 is assembled therein. The gussets 50' disposed at opposite sides of the center post 24 may also comprise individual elements which are assembled and welded in place in the same manner as the outer gussets previously considered; however, the center post gussets preferably are formed integrally with the face plate 36 so that the entire face plate unit can be made economically by a single stamping operation.

A problem is presented when mounting windows in a metal frame by means of the conventional rubber weather strip 44. For example, it is essential that the mounting part of the frame be of generally uniform thickness, or, alternatively, that it change thickness for only a relatively short distance in order to maintain a proper weathertight seal between the strip 44 and the frame. Experience has shown that it is practically impossible to bond the rubber weather strip to a single flange thickness for a substantial distance and then adapt the strip to a double flange thickness which also extends for a substantial distance. The rubber material from which the weather strip is made simply will not bond under these conditions. However, experience also has shown that the weather strip can be bonded perfectly to a flange formed from a single thickness of metal for substantially its entire length, even though relatively short portions of the supporting flange are of double thickness. Under these conditions the rubber apparently adapts itself to the change in dimension without destroying the weather seal properties of the strip because the change or changes in the generally uniform thickness dimension are relatively short. Therefore, in developing a window mounting frame of the type here under consideration it is necessary to maintain the flange which supports the window of generally uniform thickness; or, if variations in the thickness dimension are necessary, to keep these variations essentially small. The structure here illustrated is admirably suited to this end.

In connection with the foregoing it will be observed that the weather sealing strip 44 extends continuously around the window and window opening with which it is associated. The window opening in turn is defined on three sides by the flanges 20, on the fourth side by the adjacent flange 28 of center post 24, and at the corners thereof by the gussets 50. By reason of the particular arrangement and correlation of these parts, the weather strip 44 is received by a single thickness of metal except for the essentially small, generally triangular areas at the ends of the gussets 50 and 50' which overlap the supporting flanges. These overlapping areas which present a double thickness of metal are so small that the changes in dimension which occur at these points do not prevent proper sealing of the weather strip to the flanges. This is an important feature of the invention as considerable difficulty frequently is experienced in providing a proper mounting for the window which is essentially simple and economical to manufacture so as to be competitive in a highly competitive market and at the same time is sufficiently strong and rigid so as to withstand strains and abuse to which apparatus of this character is subject in use.

Another advantage of the instant invention derives from the double-flange tubular frame 10. This particular arrangement not only provides the necessary single supporting flange for the weather strip 44 but also provides a double-flange thickness outside the weather strip to assure an adequately strong, rigid supporting framework. When the two flanges 20 and 22 are spot welded together, they are adequately strong and the double thickness of metal outside the window provides a rigid support which prevents excessive and destructive vibration of the windshield 38 in use.

In addition to the above, the double thickness of metal provided by the two flanges 20 and 22, coupled with the arrangement which makes the flange 20 wider than the flange 22, provides a simple yet highly efficient means for supporting the gussets 50 and 50' and for positioning these gussets with the curved inner edge thereof aligned properly with respect to the adjacent edges of the relatively wide flanges 20 and for spot welding during fabrication of the frame. In this connection it will be observed that the gussets 50 and 50' should be positioned with the curved inner edges thereof substantially tangent to the edges of the adjacent flanges 20 so that the gussets merge smoothly with the flanges and thus insure a continuous, essentially smooth edge around the window opening for the window sealing strip 44. Also, in connection with the other function performed by the particular relationship described between the gusset plates and the cooperating flanges 20 and 22 and concerned particularly with facilitating spot welding of the gussets to the supporting flange portion, it will be observed that the gussets 50 and 50' are supported laterally on the projecting outer marginal portions of the flanges 20 and that they butt edgeways against the relatively narrow flanges 22. The butting engagement of the gussets 50 and 50' with the flanges 22 restrains the gussets against outward lateral movement and positions the same securely during the spot-welding operation which fastens the gussets to the frame.

In this connection it should be pointed out that the operation of spot welding the gussets 50 and 50' to the surrounding frame 10 is relatively inexpensive as compared with seam welding or arc welding a piece onto the corner of the frame as in conventional constructions. Thus, the construction and arrangement of parts here shown is simple so as to maintain construction and fabrication costs at a minimum, yet adequately strong for the particular use intended.

Another advantage of the flanged tubular outer frame is that the flanges can be utilized for a double purpose in the combination. Not only do the flanges provide a supporting means for the windows 38 but they also provide a convenient mounting for the windshield wipers and other conventional accessories with which apparatus of this type conventionally is equipped.

Reference is now had to the form of the invention shown in Figs. 5 and 6 which is identical to the form first described except that the mounting flanges 20 and 22 of the surrounding frame 10 are preferably made equal in width and the windows 60 are made square at the corners. This construction eliminates the gussets 50 and 50' and has the advantage that a single thickness is provided for the weather stripping 44 entirely around the window 60. However, the weather strip 44 cannot be formed around a sharp corner of the type presented by the window 60, and it is necessary to provide a separate weather strip along each side of the window. These strips are then either mitered and butted together at the corners of the windows or, alternatively, the individual side strips are terminated short of the corners, and small corner sections are injection molded before the window 60 is assembled in the frame. The former alternative construction has the advantage that it is less expensive but it also has the disadvantage that it does not result in as finished an article as the last-mentioned procedure. As suggested, the second alternative construction has the advantage that the corner sections join with the side sections to produce in effect a continuous sealing strip which extends entirely around a window opening but it has the disadvantage that it is relatively more expensive than the procedure first mentioned in that it involves the use of equipment not required for the first procedure.

The modified construction has the advantage of greater visibility afforded by the square corners of the window and the advantage of providing a single-thickness mounting for the window, but it has the disadvantage that it is more expensive to manufacture than the form first described. The operation of injection molding the corner section 62 is more expensive to a significant degree than is the operation of providing and assembling the gussets 50 and 50' in the windshield structure. However, under circumstances where the greater visibility afforded by the modified construction is necessary or is sufficiently desirable to warrant the increase in cost, this construction can be employed to advantage. It is mechanically simple and adequately strong and rigid to serve its intended purpose. At the same time, the modified construction possesses all of the advantages over the panel-type windshield heretofore used inherent in and described in connection with the first form of the invention.

Having thus described the invention, I claim:

1. A windshield construction for automotive vehicles comprising a tubular surrounding frame having a relatively wide flange and a relatively narrow flange both formed integrally with the frame and both extending inwardly of the frame in side-by-side relation, said relatively wide flange having a portion projecting inwardly beyond said relatively narrow flange, gussets at the corners of the frame butting against and extending substantially flush with said relatively narrow flange and engaging laterally against and secured to the projecting portion of said relatively wide flange, the butted engagement between said gussets and said relatively narrow flange positioning the inner edges of the end portions of the gussets essentially in alignment with the edge of said relatively wide flange, a transparent window in said frame, and weather stripping of resilient material interconnecting said window and said frame, said stripping having parts embracing the projecting portion of said relatively wide flange along the sides of the frame and said gussets at the corners thereof, the overlapping areas of said projecting flange portion and said gussets engaged by the mentioned parts of said stripping being essentially small to assure weathertightness of the window.

2. A windshield construction for automotive vehicles comprising a tubular surrounding frame having two integral, inwardly extending flanges disposed side by side and one projecting substantially beyond the other, gussets butting against and extending substantially flush with said other flange and engaging laterally against and spot welded to the projecting portion of said one flange, the butted engagement between said gussets and said relatively narrow flange positioning the inner edges of the end portions of the gussets essentially in alignment with the edge of said relatively wide flange, a transparent window in said frame, and a weather sealing strip interconnecting the window and the frame, said strip having an outer peripheral groove receiving the projecting portion of said one flange and said gussets, the overlapping areas of said flange and said gussets being essentially small to assure close-fitting intimate engagement of the same with said strip.

3. A windshield frame for automotive vehicles comprising top, bottom and side members of elongated tubular conformation interconnected at the ends thereof to form a generally rectangular surrounding framework, said members having inwardly extending flanges disposed side by side and one of said flanges projecting inwardly beyond the other, and gussets at the corners of said framework butting against and extending substantially flush with said other flange and engaging laterally against and secured to the projecting portion of said one flange, the butted engagement between said gussets and said relatively narrow flange positioning the inner edges of the end portions of the gussets essentially in alignment with the edge of said relatively wide flange, said gussets forming in effect a continuation of but offset laterally from said one flange and the overlapping portions of said one flange and said gussets being essentially small.

4. A windshield frame for automotive vehicles comprising elongated tubular members interconnected to form a surrounding framework, each of said members having a pair of inwardly extending integral flanges disposed side by side, one flange of each member being relatively narrow and the other flange thereof being relatively wide and projecting inwardly beyond said relatively narrow flange, corresponding flanges of the several members being in the same plane, gusset plates at the corners of said framework bearing laterally against and being spot welded to the projecting portions of said relatively wide flanges, said gusset plates butting edgeways against said relatively narrow flanges and the latter co-operating therewith to position the inner edges of the end portions of the gusset plates substantially in alignment with the corresponding edges of said relatively wide flanges and also serving to position and support said gusset plates for spot welding.

5. A windshield construction for automotive vehicles comprising a tubular surrounding frame having two integral inwardly extending flanges disposed side by side and one projecting substantially beyond the other, gussets engaging laterally against the projecting portion of said one flange and butting edgewise against said other flange, a center post dividing said frame into two sections, said post arranged with one side thereof flush with said projecting flange and including a front plate disposed flush with said other flange, said plate overlapping and secured to the projecting portion of said one flange and provided at the ends thereof with lateral projections forming gussets at the juncture of the post and the adjacent portions of the frame.

6. A windshield construction for automotive vehicles comprising a tubular surrounding frame having two integral inwardly extending flanges disposed side by side and one projecting substantially beyond the other, gussets engaging laterally against the projecting portion of said one flange and butting edgewise against said other flange, a center post dividing said frame into two sections, said post arranged with one side thereof substantially flush with said projecting flange and including a front plate disposed flush with said other flange, said plate overlapping and secured to the projecting portion of said one flange and provided at the ends thereof with lateral projections forming gussets at the juncture of the post and the adjacent portions of the frame, a transparent window in each section of the frame, and a weather sealing strip interconnecting each window and the frame section in which it is mounted, each of said strips having parts embracing the projecting flange portions of the frame and said gussets, and the overlapping areas of the gussets and said flange portions being essentially small to assure weathertightness of the windows.

7. A windshield construction for automotive vehicles comprising a tubular, generally rectangular frame having a relatively wide flange and a relatively narrow flange, both formed integrally with the frame and both extending inwardly of the frame in side-by-side relation, said relatively wide flange projecting inwardly beyond said relatively narrow flange, gusset plates at the corners of the frame butting against and extending substantially flush with said relatively narrow flange and engaging laterally against and secured to the projecting portion of said relatively wide flange, a center post dividing the frame into two sections having laterally extending flanges disposed substantially flush with the relatively wide flange of said frame, said post also including a platelike part overlapping the projecting portion of said relatively wide flange at the ends thereof and abutting edgewise against the relatively narrow flange of said frame, said platlike part provided at the ends thereof with lateral projections forming gussets at the juncture thereof and the adjacent portions of the frame, and means securing the overlapping portions of said platelike member to the projecting portions of said relatively wide flange.

8. The combination as set forth in claim 7 wherein the lateral projections on the platlike part of said center post are formed integrally with and extend in the same plane as said platelike part.

9. A windshield construction for automotive vehicles comprising a tubular, generally rectangular frame having a relatively wide flange and a relatively narrow flange, both formed integrally with the frame and both extending inwardly of the frame in side-by-side relation, said relatively wide flange projecting inwardly beyond said relatively narrow flange, gusset plates at the corners of the frame extending substantially flush with said relatively narrow flange and engaging laterally against and secured to the projecting portion of said relatively wide flange, a center post dividing the frame into two sections having laterally extending flanges extending substantially flush with the relatively wide flange of said frame, said post also including a platelike part overlapping the projecting portions of said relatively wide flanges at the ends thereof and extending substantially flush with the relatively narrow flange of said frame, said platelike part provided at the ends thereof with lateral projections forming gussets at the juncture of the part and the adjacent portions of the frame, means securing the overlapping portions of said platelike member to the projecting portions of said relatively wide flange, a transparent window in each section of the frame, and a weather strip interconnecting each window and the part of the frame in which it is mounted, each of said strips embracing the projecting portion of said relatively wide flange, one of the flanges of said center post and said gussets, the overlapping areas of said projecting flange portion and said gussets engaged by the mentioned parts of said weather strip being essentially small to assure weather-tightness of the window.

10. A windshield construction for automotive vehicles comprising a tubular surrounding frame having two integral, inwardly extending flanges disposed side by side and one projecting substantially beyond the other, a center post dividing said frame into two sections, said post butting at its ends on said frame and including a front plate disposed flush with said other flange, said plate overlapping and secured to the adjacent portion of said one flange.

11. A generally rectangular windshield frame for automotive vehicles, said frame having a separate structural member at each side thereof and each of said structural members having an inwardly extending flange, the flanges of said members being in essentially coplanar relation for supporting engagement with a window sealing strip, means interconnecting said structural members at the corners of the frame, and separate gusset plates set into the corners of the frame overlapping and connected to the flanges of said structural members, said gusset plates having curved inner edges disposed in alignment with the inner edges of said flanges so that the edge portions of said flanges and said gusset plates mutually co-operate to provide an essentially continuous support for the sealing strip, the overlapping portions of said flanges and said gusset plates engageable by the window sealing strip being essentially small so as to minimize variations in thickness of said strip supporting edge portions.

12. A windshield frame for automotive vehicles comprising a plurality of individual structural members arranged generally in the form of a rectangle and each having an inwardly extending flange, the flanges of said structural members being in essentially coplanar relation for supporting engagement with a window sealing strip, means interconnecting said structural members, separate gusset plates set into the corners of the frame overlapping and connected to the flanges of said structural members, and means engaging said gusset plates to position the inner edges thereof in alignment with the inner edges of said flanges so that said edges mutually co-operate to provide an essentially continuous supporting edge for the sealing strip, the overlapping portions of said flanges and said gusset plates engageable by the window sealing strip being essentially small so as to minimize variations in thickness of the strip supporting edge portions.

13. A windshield frame for automotive vehicles comprising a plurality of individual structural members arranged generally in the form of a rectangle and each having an inwardly extending flange, the flanges of said structural members being in essentially coplanar relation for supporting engagement with a window sealing strip, separate gusset plates set into the corners of the frame overlapping and connected to the flanges of said structural members, said structural members having other inwardly extending flanges overlying said first-mentioned flanges and butting against said gusset plates to position the inner edges thereof in alignment with the inner surface of said first-mentioned flanges so that said edges mutually co-operate to provide an essentially continuous support for the sealing strip, said other flanges being fastened to said first-mentioned flanges and reinforcing the same entirely around the sealing strip supporting portion thereof.

References Cited in the file of this patent

UNITED STATES PATENTS

| 1,700,502 | Levan | Jan. 29, 1929 |
| 2,105,180 | Blessin | Jan. 11, 1938 |
| 2,405,394 | Austin | Aug. 6, 1946 |
| 2,613,406 | Dean | Oct. 14, 1952 |